United States Patent [19]

Cheng

[11] 4,135,005

[45] Jan. 16, 1979

[54] STABILIZED ICINGS

[75] Inventor: Hsiung Cheng, San Diego, Calif.

[73] Assignee: Merck & Co., Inc., Rahway, N.J.

[21] Appl. No.: 794,773

[22] Filed: May 9, 1977

[51] Int. Cl.² .............................................. A23G 3/00
[52] U.S. Cl. .................................... 426/659; 426/572; 426/573
[58] Field of Search ......................... 426/572, 573, 659

[56] References Cited

U.S. PATENT DOCUMENTS

| | | | |
|---|---|---|---|
| 2,474,019 | 6/1949 | Steiner | 426/659 |
| 2,682,472 | 6/1954 | Wagner | 426/659 |
| 2,789,911 | 4/1957 | Toulmin, Jr. | 426/659 |
| 2,846,314 | 8/1958 | Aichele et al. | 426/572 |
| 2,914,410 | 11/1959 | Butler | 426/572 |
| 2,938,798 | 5/1960 | Toulmin, Jr. | 426/659 |
| 3,009,812 | 11/1961 | Ganz | 426/659 |
| 3,030,211 | 4/1962 | McDonald | 426/572 |
| 3,276,881 | 10/1966 | Troller | 426/659 |
| 3,803,333 | 4/1974 | Roudebush | 426/659 |
| 3,804,951 | 4/1974 | Rapp | 426/659 |
| 3,849,583 | 11/1974 | Aartsen | 426/659 |
| 4,037,000 | 7/1977 | Burge | 426/659 |

Primary Examiner—Jeanette M. Hunter
Attorney, Agent, or Firm—Donald J. Perrella; Hesna J. Pfeiffer; Julian S. Levitt

[57] ABSTRACT

Freeze-thaw and heat stable icings are obtained by using an icing composition containing a high melting point fat and a gelling system consisting essentially of xanthan gum and locust bean gum.

6 Claims, No Drawings

STABILIZED ICINGS

BACKGROUND OF THE INVENTION

1. Field of the Invention

The present invention relates to icing compositions for baked and fried foods, and more particularly relates to icing compositions which are stable to heat and to freeze-thaw cycling.

2. Objects of the Invention

It is an object of the present invention to provide an improved icing composition. Another object is to provide an icing composition which has improved heat and freeze-thaw stability. A further object is to provide an icing composition which uses xanthan gum and locust bean gum as stabilizers. These and other objects of the present invention will be apparent from the following description.

SUMMARY OF THE INVENTION

Freeze-thaw and heat stable icings which do not require the presence of a proteinaceous material or other hydrocolloids are obtained by using an icing composition containing a high melting point fat and a gelling system consisting essentially of xanthan gum and locust bean gum.

DETAILED DESCRIPTION

Icings are coatings for baked and fried goods. The major ingredients of icings are sugar and water. Although the properties desired in an icing will vary with the use to be made of the icing, a universal requirement is stability. By freeze-thaw stability is meant the ability of the icing to withstand one or more freezing and thawing cycles without cracking or changing the icing structure, without separation of any substantial amount of liquid therefrom or without affecting adherence of the icing to baked or fried goods. By heat stability is meant the ability of the icing to prevent or minimize change in structure, melting and sugar recrystallization, cracking, or loss of adherence from the baked or fried goods upon heating.

Generally an icing composition contains a sugar, water, fat or oil, emulsifier, salt, and coloring and flavoring. The sugar may be any edible sugar such as, for example, sucrose, fructose, dextrose, invert sugar, corn syrup solids, fondant sugar and the like. The emulsifier may be any suitable surface active agent such as the mono- and diglycerides of higher fatty acids, the sorbitan esters of the higher fatty acids, the polyoxyethylene derivatives of sorbitan esters of higher fatty acids, the polyoxyethylene derivatives of such esters, or mixtures of the foregoing materials. The formulation of such icing compositions is known to those skilled in this art.

It has now been found that an improved freeze-thaw and heat stable icing is obtained from icing compositions containing a high melting point fat and a gelling composition comprising from about 25 to about 75 parts by weight xanthan gum and from about 25 to about 75 parts by weight of locust bean gum, the gelling composition being present in an amount effective to impart freeze-thaw stability and heat stability. Any edible fat having a high melting point, e.g. from about 32° C. to about 55° C. may be used, preferably from about 45° C. to about 55° C. Typically, an icing composition of the present invention consisting essentially of in % by weight from about 70 to about 85% sugar, from about 15 to about 30% water, from about 0.5 to about 4% fat, from about 0.1 to about 0.5% emulsifier, from about 0.1 to about 0.5% salt, and from about 0.001 to about 0.1% of a gelling system consisting essentially of from about 25 to about 75% xanthan gum and from about 75% to about 25% locust bean gum. Other hydrophillic colloids may optionally be present to modify the properties of the icing, e.g. propylene glycol alginate to increase viscosity and enhance sheen, or agar to form a gel.

The following examples illustrate the present invention without, however, limiting the same thereto.

EXAMPLE 1

| Ingredients: | Parts by Weight |
| --- | --- |
| Part I | |
| Water | 16.600 |
| Granular sugar | 3.000 |
| Xanthan gum | 0.025 |
| Locust bean gum | 0.025 |
| Part II | |
| Granular sugar | 16.500 |
| Fat, m.p. 51–54° C | 1.500 |
| Emulsifier (high melting point mono- and diglyceride mixture | 0.200 |
| Salt | 0.300 |
| Part III | |
| 10 X Sugar (contains 3% starch) | 61.850 |
| | 100.000 |

Coloring and flavoring may be incorporated as desired in Part III.

Procedure

The dry ingredients of Part I are well blended and added to the water while mixing. The resulting solution is heated to boiling and boiled for 2 minutes. The ingredients of Part II are added to the boiled solution of Part I ingredients and heated to boiling. The resulting solution is added slowly to a small Hobart mixer equipped with paddle and a steam-heated water bath to which the Part III ingredients have previously been added while mixing at No. 1 speed and heating to maintain temperature above 57° C. until smooth.

The resulting icing is applied at 57° C. ± 1.1° C. to fresh cooled donuts (37°–43° C.). The icing is coated on the donuts using donut coating equipment with excellent adhesion with no icing rundown on the sides of donuts. The coating marks (from the donut coating equipment) heal immediately and skin forms within 20 seconds. The icing hardens and dries in less than 7 minutes. The icing not only has excellent sheen and opacity but also has excellent eating qualities. After standing at room temperature for a total of 10 minutes, the donuts are packed and a sealed paper carton and frozen in a freezer. When frozen, the donuts are thawed at room temperature for 2 hours. This is considered as one freeze-thaw cycle. Visual inspection of the icing after four freeze-thaw cycles reveals no weeping or cracking and no change in sheen, icing structure, adherence or eating qualities. The frozen donuts are also thawed by heating at 160° C. for 3–5 minutes in an oven. The icing does not crack, melt, change structure or lose adhesion upon heating. The icing is still stable after four freeze-thaw cycles and upon heating.

EXAMPLE 2

| Ingredients: | Parts by Weight |
| --- | --- |
| Part I | |
| Water | 16.600 |

-continued

| Ingredients: | Parts by Weight |
|---|---|
| Granular sugar | 3.000 |
| Xanthan gum | 0.030 |
| Locust bean gum | 0.015 |
| Part II | |
| Granular sugar | 16.500 |
| Fat, m.p. 51–54° C | 1.500 |
| Emulsifier (high m.p. mono- and diglyceride mixture) | 0.200 |
| Salt | 0.300 |
| Part III | |
| 10 X Sugar (contains 3% starch) | 61.855 |
| | 100.000 |

Coloring and flavoring may be incorporated as desired in Part III. The icing is prepared, applied to donuts, and evaluated as described in Example 1. Similar results are obtained.

EXAMPLE 3

| Ingredients: | Parts by Weight |
|---|---|
| Part I | |
| Water | 16.60 |
| Granular sugar | 3.00 |
| Xanthan gum | 0.02 |
| Locust Bean gum | 0.02 |
| Agar | 0.05 |
| Emulsifier (high m.p. mono- and diglyceride mixture) | 0.20 |
| Part II | |
| Fat, m.p. 51–54° C | 1.50 |
| Granular sugar | 20.00 |
| Salt | 0.15 |
| Part III | |
| 10 X Sugar (contains 3% starch) | 58.46 |
| | 100.00 |

Coloring and flavoring may be incorporated as desired in Part III. The icing is prepared, applied to donuts, and evaluated as described in Example 1. Similar results are obtained.

EXAMPLE 4

| Ingredients: | Parts by Weight |
|---|---|
| Part I | |
| Water | 16.600 |
| Granular sugar | 3.000 |
| Xanthan gum | 0.005 |
| Locust Bean gum | 0.005 |
| Part II | |
| Granular sugar | 16.500 |
| Fat, m.p. 51–54° C | 1.500 |
| Emulsifier (high m.p. mono- and diglyceride mixture) | 0.200 |
| Salt | 0.300 |
| Part III | |
| 10 X Sugar (contains 3% starch) | 61.89 |
| | 100.00 |

Coloring and flavoring may be incorporated as desired in Part III. The icing is prepared, applied to donuts, and evaluated as described in Example 1. Similar results are obtained.

EXAMPLE 5

| Ingredients: | Parts by Weight |
|---|---|
| Part I | |
| Water | 16.600 |
| Granular sugar | 3.000 |
| Xanthan gum | 0.025 |
| Locust Bean gum | 0.025 |
| Part II | |
| Granular sugar | 16.500 |
| Fat, m.p. 51–54° C | 1.500 |
| Emulsifier (high m.p. mono- and diglyceride mixture) | 0.200 |
| Salt | 0.300 |
| Part III | |
| Dry Fondant sugar (contains 8% invert sugar) | 61.850 |
| | 100.000 |

Coloring and flavoring may be incorporated as desired in Part III. The icing is prepared, applied to donuts, and evaluated as described in Example 1. Similar results are obtained.

EXAMPLE 6

| Ingredients: | Parts by Weight |
|---|---|
| Part I | |
| Water | 16.600 |
| Granular sugar | 3.000 |
| Xanthan gum | 0.025 |
| Locust bean gum | 0.025 |
| Part II | |
| 42 D.E. Corn Syrup | 6.000 |
| Granular sugar | 9.500 |
| Fat, m.p. 51–54° C | 1.500 |
| Emulsifier (high m.p. mono- and diglyceride mixture) | 0.200 |
| Salt | 0.300 |
| Part III | |
| 10 X Sugar (contains 3% starch) | 63.850 |
| | 100.000 |

Coloring and flavoring may be incorporated as desired in Part III. The icing is prepared, applied to donuts, and evaluated as described in Example 1. Similar results are obtained.

EXAMPLE 7

| Ingredients | Parts by Weight |
|---|---|
| Part I | |
| Water | 8.000 |
| Granular sugar | 1.750 |
| Xanthan gum | 0.020 |
| Locust bean gum | 0.020 |
| Agar | 0.050 |
| Part II | |
| Granular sugar | 8.000 |
| Fat, m.p. 51–54° C | 1.500 |
| Emulsifier (high m.p. mono- and diglyceride mixture) | 0.200 |
| Salt | 0.300 |
| Part III | |
| Liquid Fondant sugar (Contains 10% invert sugar) | 80.160 |
| | 100.000 |

Coloring and flavoring may be incorporated as desired in Part III. The icing is prepared, applied to donuts, and evaluated as described in Example 1. Similar results are obtained.

EXAMPLE 8

| Ingredients: | Parts by Weight |
|---|---|
| Part I | |
| Granular sugar | 27.16 |
| Water | 18.80 |
| Fat, m.p. 51–54° C | 1.60 |
| Emulsifier (high m.p. mono- and diglyceride mixture) | 0.20 |
| Salt | 0.20 |

| Ingredients: | Parts by Weight |
|---|---|
| Xanthan gum | 0.02 |
| Locust baen gum | 0.02 |
| Part II | |
| 10 X Sugar (contains 3% starch) | 52.00 |
| | 100.00 |

Procedure

Add Part II to a small Hobart mixer equipped with paddle in a steam-heated water bath. Blend dry ingredients in Part I well and add to water while mixing, heat to boiling and hold for 3 minutes. Add this solution slowly to Part II while mixing and heating to maintain the mixture's temperature above 135° F. Maintain glaze at 135°±2° F. for application to fresh, cooled donuts (100°–110° F.) Results similar to those described in Example 1 are obtained.

What is claimed is:

1. In an icing composition containing sugar and water as major ingredients, the improvement wherein the composition contains a fat having a melting point of from about 32° to about 55° C. and also a gelling system consisting essentially of from about 25 to about 75 weight % xanthan gum and from about 75 to about 25 weight % of locust bean gum, the gelling system being present in an amount effective to impart freeze-thaw stability and heat stability to the icing composition.

2. An icing composition according to claim 1 wherein the fat has a melting point of from about 45° to about 55° C.

3. An icing composition according to claim 1 wherein the fat has a melting point of from about 51° to about 54° C.

4. An icing composition according to claim 1 wherein the gelling system is present is an amount of from about 0.005 to about 0.1 weight % of the total weight of the icing composition.

5. An icing composition according to claim 4 wherein the fat has a melting point of from about 45° to about 55° C.

6. An icing composition according to claim 4 wherein the fat has a melting point of from about 51° to about 54° C.

* * * * *